Oct. 31, 1944.   P. S. TURNER   2,361,438
LIGHT WEIGHT PLASTIC COMPOSITION AND METHOD
Filed Jan. 29, 1942

PHILIP S. TURNER
INVENTOR
BY
ATTORNEY

Patented Oct. 31, 1944

2,361,438

UNITED STATES PATENT OFFICE 2,361,438

LIGHTWEIGHT PLASTIC COMPOSITION AND METHOD

Philip S. Turner, Williamsport, Pa.

Application January 29, 1942, Serial No. 428,751

8 Claims. (Cl. 154—2)

(Granted under the act of March 3, 1883, as amended April 30, 1928; 370 O. G. 757)

This invention relates to plastic constructions and more particularly to light-weight plastic compositions, structures formed of said compositions and methods of making the same.

Thermo-setting plastics composed of phenol formaldehyde and the like with or without a filler have not in general been as light in weight as would be desirable. This is especially true where reenforcing members or fillers of high specific gravity are included in the plastic mass.

In the molding and heat curing of thermo-setting plastics, extremely high pressures are generally required. The molds therefore of necessity are cumbersome and expensive. In the practice of the present invention thermo-setting plastics with or without reenforcing can be molded at relatively low temperatures and pressures to provide light-weight compositions suitable for aircraft, and other structures where unnecessary weight is to be avoided.

The principal object of this invention is to provide a light weight thermo-setting plastic capable of being reenforced with other materials of higher modulus in the fabrication of light weight structural members having a high resistance to bending, buckling and the like.

Another object of this invention is to provide a method of fabricating strong light weight structures consisting in part of thermo-setting plastics, in which extremely high pressures are not required in the curing of the plastic.

Other and further objects of the invention will be apparent from the following specification when read in connection with the accompanying drawing, in which—

In the hot curing of thermo-setting plastics of phenol-formaldehyde and the like water and other vapors are formed and driven off by the incident heat and chemical reactions, and these vapors normally tend to expand as a function of the temperature to which they are subjected. This expansion may however be minimized by increased pressure. In order to provide a plastic that is free from large bubbles and blow holes, extremely high pressures have heretofore been employed during curing. In the practice of the present invention the water freed as an incident to curing a thermo-setting plastic is absorbed by starch granules included in the plastic mass.

When an uncured phenol-formaldehyde plastic mass is provided with from 2% to 12% by weight of starch granules intimately mixed with or suspended on fibers included in the mass, and that mass is cured, the water and other vapors formed by the chemical reaction, together with the water originally contained in the starch and the resin, cause the starch particles to swell and produce a closed cell structure which has a lower density than the weighted average density of the ingredients. Lighter weight material is produced by lowering the curing pressure. An increase in the curing temperature also produces lighter material. The swelling of the starch is normally controlled to prevent the starch grains from exploding.

The material formed by the inclusion of starch in the thermo-setting resin is a closed cell-type of structure having each swollen starch grain included in the resin. At the completion of the cure, and upon cooling of the material, the water vapor captured by each starch particle condenses leaving a generally spherically-shaped void in the material much larger than the original starch grain.

Figure 1:
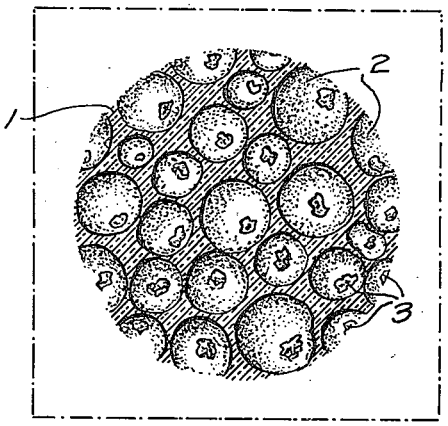
Fig. 1 is a cross-sectional view greatly enlarged of a small piece of the light weight plastic composition.

In Fig. 1 of the drawing, which corresponds to a photomicrograph of the light weight material, made in accordance with the above teachings, reference numeral 1 denotes the plastic composition, while 2 denotes the voids left by starch particles, and numeral 3 represents the small starch grain included in the voids in the cured plastic material.

The drawing in Fig. 1 does not include a showing of the reenforcing material which may or may not be included in the plastic mass. Fibrous material is desirable but not necessary to hold the starch dispersed through the material and to add to the toughness and strength of the product.

A plastic material with a great number of voids while of practical value by itself is most useful in connection with high-modulus, high-strength materials such as aluminum, stainless steel, magnesium, glass fibers, etc., which are contained in and/or applied to the surfaces of the low density core and bonded thereto in the molding of the plastic. The best bonds between metallic faces and plastic cores are obtained when there is a substantial match of the thermal coefficients of expansion of the facing material and the aggregate core material. A formula outlining a method of compounding the core material to obtain any desired coefficient of thermal expansion within reasonable limits is the subject-matter of my co-pending application entitled "Method of making materials to have predetermined coefficients of expansion," Serial Number 428,752, filed January 29, 1942, the disclosure of which is incorporated herein by reference.

Figure 2:
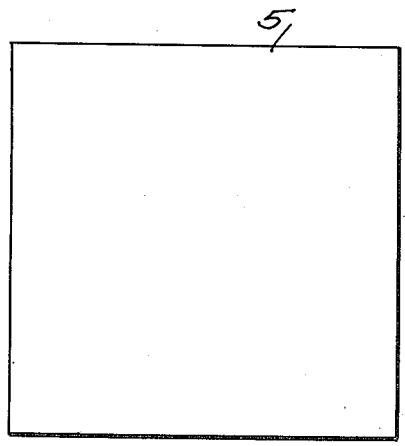
Fig. 2 is a plan view of a reenforced plastic member made of the plastic shown in Fig. 1 and including metal faces and glass fiber reenforcing material.
Figure 3:
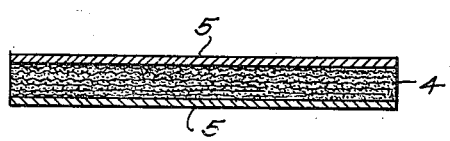
Fig. 3 is a sectional view of the member shown in Fig. 2 made at right angles to Fig. 2.

In Figs. 2 and 3 of the drawing a light weight reenforced plastic member is shown. The part 4 denotes the plastic mass proper containing voids formed by starch granules. Fig. 1 of the drawing shows a cross section of this mass greatly magnified. The plastic mass 4 also contains fibrous reenforcing, such as glass filaments or the like, which are included in such an amount as to make the thermal coefficient of expansion of the plastic and glass aggregate match the thermal coefficient of expansion of the aluminum alloy reenforcing facings shown at 5.

Figure 4:
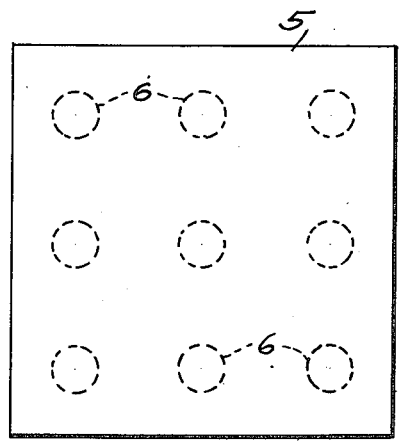
Fig. 4 is a plan view of another embodiment of the reenforced plastic composition having metal reenforcing inserts imbedded in the reenforced plastic and bonded thereto.
Figure 5:
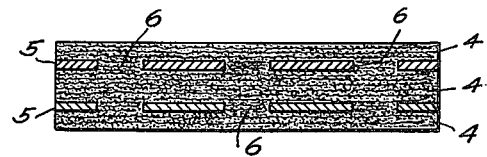
Fig. 5 is a cross-sectional view of the member shown in Fig. 4, made in the plane established by the axes of a row of the holes 6.

In Figs. 4 and 5 the plastic core is similar in composition to that shown in Figs. 2 and 3, while the imbedded reenforcing members 5, provided with apertures 6, are made of an aluminum alloy like that of members 5 in Figs. 2 and 3.

Well-bonded reenforced plastic members similar to those shown in Figs. 2 to 4, inclusive, have been fabricated from glass filaments, starch, phenol-formaldehyde resin and duralumin metal (aluminum alloy 24's). These members were made by felting the glass filaments into thin sheets, then spraying or otherwise applying starch to the glass filaments to form an open lattice sheet resembling tissue paper. Uncured phenol formaldehyde resin in the liquid form was next applied to the starch coated sheets and allowed to dry for 48 hours at approximately 40% to 60% relative humidity at approximately 25° C. Then a number of these sheets were stacked together with aluminum alloy sheets such as shown in Figs. 2 to 4, inclusive. Next the starch containing, resin impregnated sheets, together with the aluminum alloy facing or reenforcing material stacked as a unit, was subjected to heat and pressure to cure and set the resin. With a resin starch aggregate containing approximately 6% by weight starch, reenforced plastic bodies containing 29.2% by weight of glass filaments have been cured at temperatures ranging from 270° F. to 350° F. at pressures as low as 25 pounds per square inch. Where the starch and the resin have entrapped great amounts of water due to being subjected to high humidity conditions, it is of course necessary to use slightly higher pressures than where the starch and resin are in a relatively dry condition. When starch of from 2% to 12% by weight of the resin starch aggregate is included in the uncured phenol formaldehyde, light weight reenforced plastic members may be molded or cured at pressures from 20 pounds per square inch to 250 pounds per square inch, depending upon the initial moisture content of the ingredients, upon the degree of cure of the partially cured resin, and upon the temperatures used in curing. When the starch is omitted much higher pressures are required.

The ability to mold and cure thermo-setting resins at low pressures will facilitate the construction of large molded units, such as airplane wings and fuselages, with low pressure molding methods already developed with thermal setting resins, such as rubber bag molding and the like. For instance, a hollow airplane fuselage section with metal reenforcing embedded in or on the outer and inner surfaces may be made by subjecting an uncured section including the pre-shaped metal to pressure from within or from without by rubber bags inflated with live steam which at 50 #/sq. in. pressure provides a suitable curing temperature for certain applications. In structures made by this method the light weight material between the faces or reenforcing, while not of great strength in itself, imparts to the structure ability to withstand bending and buckling. The plastic material intermediate the inner and outer metallic facings may be regarded structurally as the web of an I-beam, while the metallic facings correspond to the flanges.

The above described invention may be used by or for the Government of the United States without the payment of any royalty thereon.

I claim as my invention:

1. The method of making light weight structural members composed at least in part of a phenol-formaldehyde thermo-setting resin condensation product which comprises imbedding starch granules in an uncured phenol-formaldehyde resin, the starch content ranging from 2 to 12% by weight of the resin and subsequently curing said resin starch mixture by the application of heat and pressure thereto, the pressure applied being of the order of from 1½ to 15 atmospheres.

2. The method of rendering uncured phenol formaldehyde thermo-setting resins capable of being cured at pressures within the range of from 1½ to 15 atmospheres without the formation of large and irregular voids therein which comprises incorporating in said resins starch granules of from 2 to 12% by weight of the resin.

3. A structural member composed of a phenol-formaldehyde thermo-setting resin condensation product having voids therein obtained by the method set forth in claim 1.

4. The method of regulating the density of a phenol-formaldehyde thermo-setting resin condensation product formed from a mixture containing as one ingredient a phenol-formaldehyde thermo-setting resin and 2 to 12% by weight of starch granules in admixture therewith which comprises changing the degree of swelling of the starch granules during curing by changing at least one of the curing factors including temperature pressure and moisture content while maintaining the temperature within the range of from 270° F. to 350° F., maintaining the pressure within the range of from 1½ to 15 atmospheres and maintaining the moisture content of the starch and uncured resin before curing within the range they will acquire when subjected for prolonged periods to drying in an atmosphere having a relative humidity of from 40 to 60% at a temperature of approximately 25° C.

5. The method of making light weight reenforced airplane parts containing a thermo-setting resin condensation product which comprises prefabricating and shaping opposed thin metal facings to have the exterior configuration of the respective parts, then assembling between said facings a mass comprising a thermo-setting resin having incorporated therein starch granules of from 2% to 12% by weight of the resin and finely divided reenforcing filler material having a coefficient of expansion lower than that of the cured resin, said reenforcing filler material being included in such an amount as to provide a substantial match of the coefficient of expansion of said metallic facings and said mass when cured and thereafter curing said mass in bonding contact with said facing by the application of heat thereto while maintaining a relatively low pressure between said facings of from 1½ to 15 atmospheres pressure.

6. A metal faced reenforced plastic member including a plastic having a multiplicity of substantially uniform-sized and shaped voids therein such as may be produced by the method of claim 1, the metal facings of said member being bonded to said plastic.

7. A member as set forth in claim 1 having reenforcing fibers included in said plastic.

8. The method of making light weight structural members composed at least in part of a phenol-formaldehyde thermo-setting resin condensation product which consists in applying an uncured liquid resin to a mass of fibers having a small percentage of starch grains carried thereon, and subsequently curing said resin starch fiber mixture by the application thereto of heat and pressure, the pressure lying within the range of from 1½ to 15 atmospheres.

PHILIP S. TURNER.